(12) United States Patent  
Burton et al.

(10) Patent No.: US 8,890,384 B2
(45) Date of Patent: Nov. 18, 2014

(54) CAPLESS MOUNTING FOR MOTOR

(71) Applicants: Stephen J. Burton, Fenton, MO (US); Barry M. Newberg, St. Louis, MO (US)

(72) Inventors: Stephen J. Burton, Fenton, MO (US); Barry M. Newberg, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 235 days.

(21) Appl. No.: 13/626,652

(22) Filed: Sep. 25, 2012

(65) Prior Publication Data

US 2014/0084726 A1    Mar. 27, 2014

(51) Int. Cl.
*H02K 5/00* (2006.01)

(52) U.S. Cl.
USPC ............................................. 310/91; 310/51

(58) Field of Classification Search
USPC ............................... 310/51, 89–91, 400–410
See application file for complete search history.

(56) References Cited

U.S. PATENT DOCUMENTS

| | | | | |
|---|---|---|---|---|
| 4,186,319 | A * | 1/1980 | Dochterman | 310/89 |
| 6,809,445 | B2 * | 10/2004 | Reddy | 310/89 |
| 8,278,793 | B2 * | 10/2012 | Newberg et al. | 310/91 |
| 2001/0048258 | A1 * | 12/2001 | Cook et al. | 310/91 |
| 2003/0042804 | A1 * | 3/2003 | Cook et al. | 310/51 |
| 2004/0207274 | A1 * | 10/2004 | Ewert et al. | 310/51 |
| 2007/0001522 | A1 * | 1/2007 | Nitzsche | 310/51 |
| 2007/0188026 | A1 * | 8/2007 | Bi | 310/51 |
| 2008/0284274 | A1 * | 11/2008 | Bi | 310/261 |
| 2011/0115325 | A1 * | 5/2011 | Newberg et al. | 310/91 |
| 2013/0074701 | A1 * | 3/2013 | Zhao et al. | 99/348 |

* cited by examiner

*Primary Examiner* — Thanh Lam
(74) *Attorney, Agent, or Firm* — Hovey Williams LLP

(57) ABSTRACT

A motor is provided for use in a machine. The motor includes a frame having a catch and a mounting ring retained on the frame by the catch. The motor is supported in the machine by the mounting ring.

19 Claims, 15 Drawing Sheets

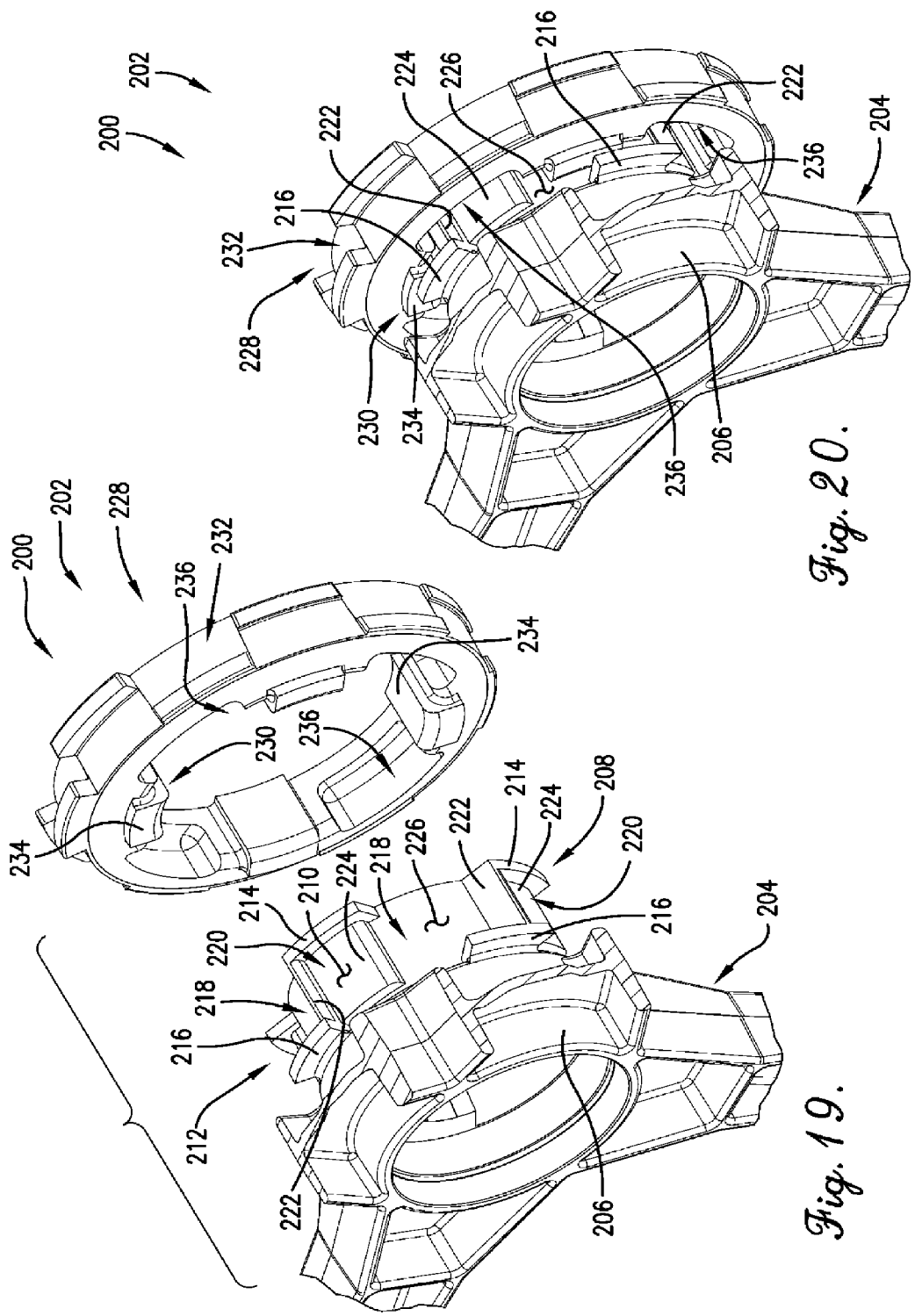

CAPLESS MOUNTING FOR MOTOR

BACKGROUND OF THE INVENTION

1. Field of the Invention

The present invention relates generally to mounting of an electric motor within a machine. More specifically, the present invention concerns an electric motor including a motor frame and a mounting ring configured to be secured in the ring-receiving opening of a motor support.

2. Discussion of the Prior Art

Those of ordinary skill in the art will appreciate that electric motors are often used in home appliances such as washing machines and clothes dryers. In a clothes dryer, for instance, an electric motor may be provided to rotate a shaft. A pulley may be rotatably driven by the shaft to induce rotation of a drum in which articles of clothing are tumbled and dried.

Although a variety of motor mounting arrangements are used, one known embodiment includes a mounting ring that is part of the motor and supported on the machine. A mounting cap is provided to secure the mounting ring on the motor.

SUMMARY

According to one aspect of the present invention, a motor for a machine is provided. The machine includes a motor support with a ring-receiving opening. The motor also includes a rotor, a stator, a mounting ring, and a motor frame. The mounting ring is configured to be secured in the ring-receiving opening of the motor support. The mounting ring includes a resiliently deformable portion configured to dampen relative motion between the motor and the machine. The mounting ring includes a locking surface. The motor frame operably supports the rotor and stator. The motor frame is also interconnected with the mounting ring and thereby supported on the motor support. The motor frame includes an integral catch engaging the locking surface to at least substantially block separation of the mounting ring from the motor frame.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 19 is an exploded rear perspective view of the frame and mounting ring of the machine of FIGS. 15-18, prior to axial movement of the ring onto the frame for assembly;

FIG. 20 is a rear perspective view of the frame and mounting ring of FIG. 19, after axial movement of the ring onto the frame and prior to twisting of the ring about the frame for assembly;

Figure 1:
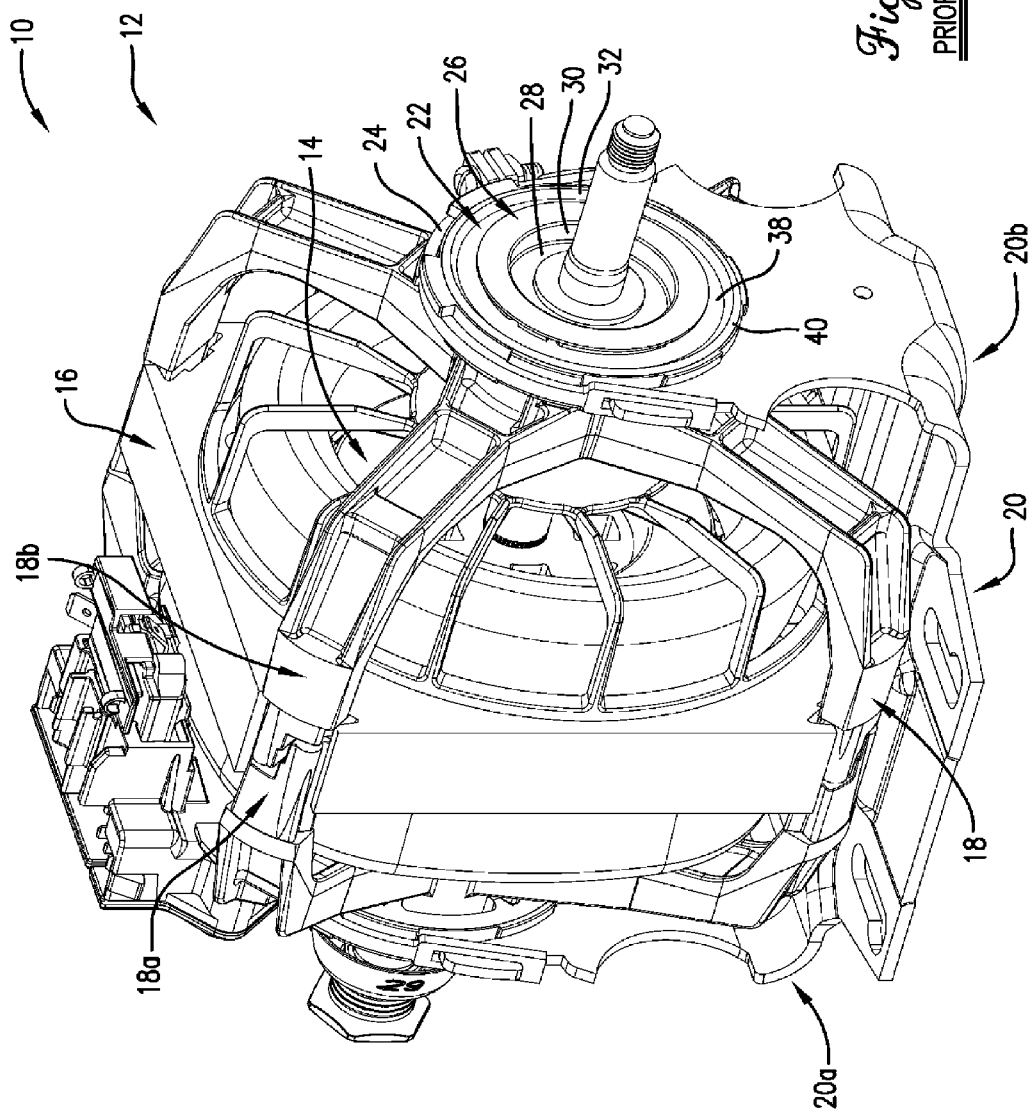
FIG. 1 is a front perspective view of a prior art machine.
Figure 2:
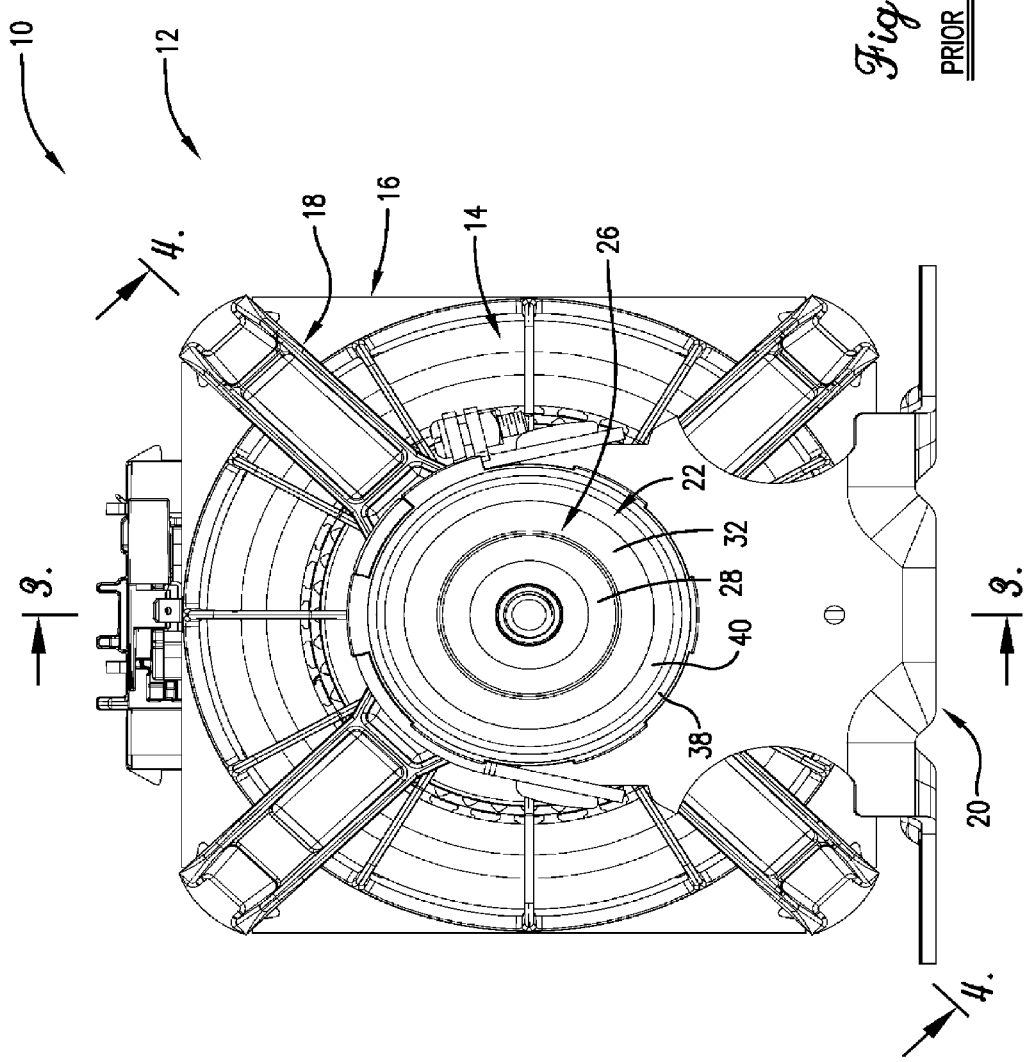
FIG. 2 is a front elevational view of the prior art machine of FIG. 1.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIGS. 1-7, a prior art machine 10 including a motor 12 is depicted. The machine 10 may suitably be any one of a variety of types, including but not limited to clothes dryers, washing machines, etc. It is noted that the motor is particularly suitable for use in a horizontal orientation, with the rotor axis being at least generally horizontal, although such an arrangement is not required. The motor 12 includes a rotor 14 that is rotatable about an axis and a stator 16 positioned radially outside the rotor 14. A motor frame 18 supports the stator 16, and the motor 12 as a whole is supported in the machine 10 on a motor support 20.

As is apparent from FIG. 1, the axial halves of the motor 12 are configured in a substantially symmetrical manner. For instance, the frame 18 includes at least substantially identical portions 18a,18b, and the support 20 includes at least substantially identical portions 20a,20b. Therefore, for the sake of convenience and clarity, further discussion of the machine 10 and the motor 12 will refer only to one axial portion of the motor 12 (e.g, to the components associated with a single frame portion 18a or 18b). It should be understood, however, that it is permissible for one or more additional components similar to or identical to those described below to be present in the motor 12 or the machine 10 as a whole.

With continued reference to FIG. 1, the motor 12 is supported in the machine 10 by an annular mounting ring 22 that rests on the motor support 20. As is customary, a strap 24 is provided to prevent movement of the motor 12 away from the support 20 due to vibration or other jarring of the machine 10.

Figure 4:
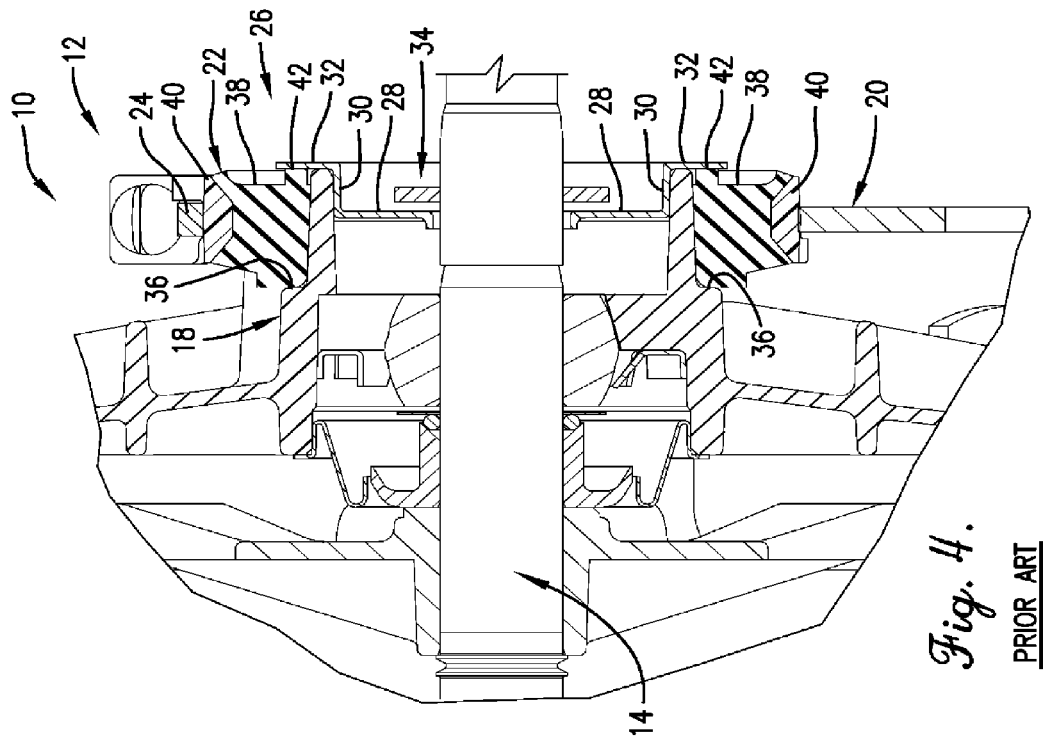
FIG. 4 is side sectional view of the prior art machine of FIG. 3, taken along section line 4-4 in FIG. 2.
Figure 3:
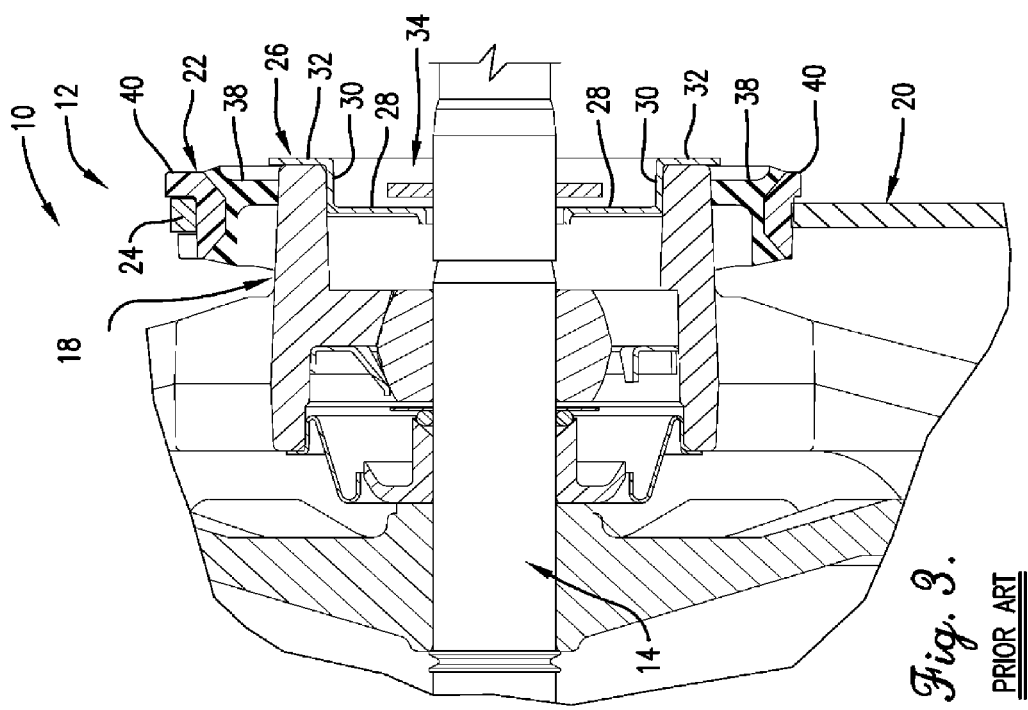
FIG. 3 is a fragmentary side sectional view of the prior art machine of FIGS. 1 and 2, taken along section line 3-3 in FIG. 2.
Figure 5:
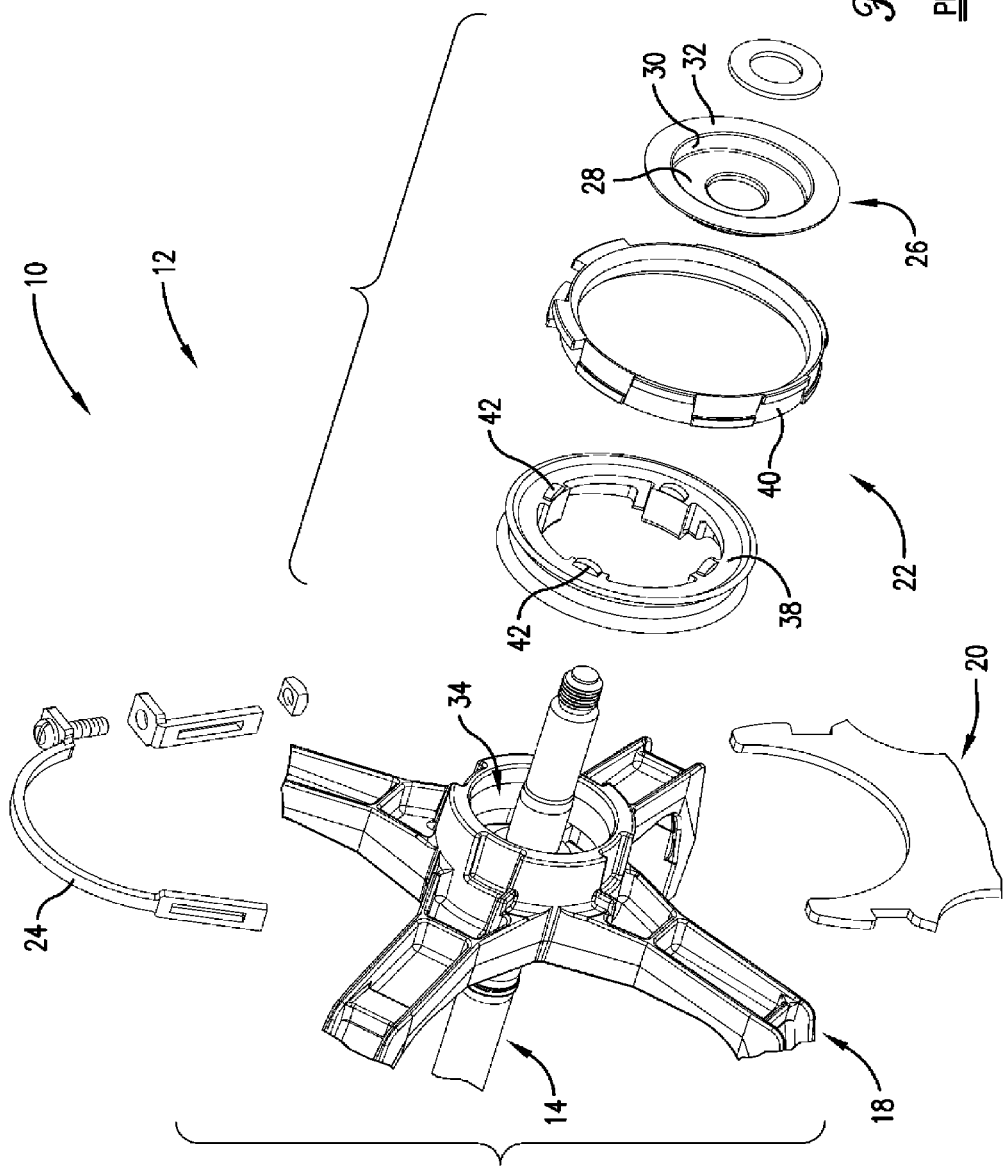
FIG. 5 is an exploded perspective view of the prior art machine of FIGS. 1-4.

As shown in FIGS. 1-5, the mounting ring 22 is secured on the motor 12 by a mounting cap 26. As best shown in FIGS. 3-5, the mounting cap 26 includes a radially extending plate 28, a circumferential sidewall 30 extending axially from the plate 28, and an annular lip 32 extending radially from the sidewall 30. The motor frame 18 defines a cap-receiving opening 34. The plate 28 is sized such that the associated sidewall 30 frictionally engages the frame 18 when the cap 26 is inserted along a first axial direction into the cap-receiving opening 34. That is, the cap 26 and the frame 18 are connected via a press fit. The lip 32 limits axial movement of the cap 26 into the cap-receiving opening 34 in the first direction and also at least substantially blocks movement of the mounting ring 22 away from the frame 18 in a second direction, wherein the second direction is opposite of the first direction. As best shown in FIGS. 4 and 5, axial movement of the mounting ring 22 toward the frame 18 (in the first direction) is limited by a plurality of circumferentially spaced shoulders 36 that are part of the frame 18.

Figure 7:
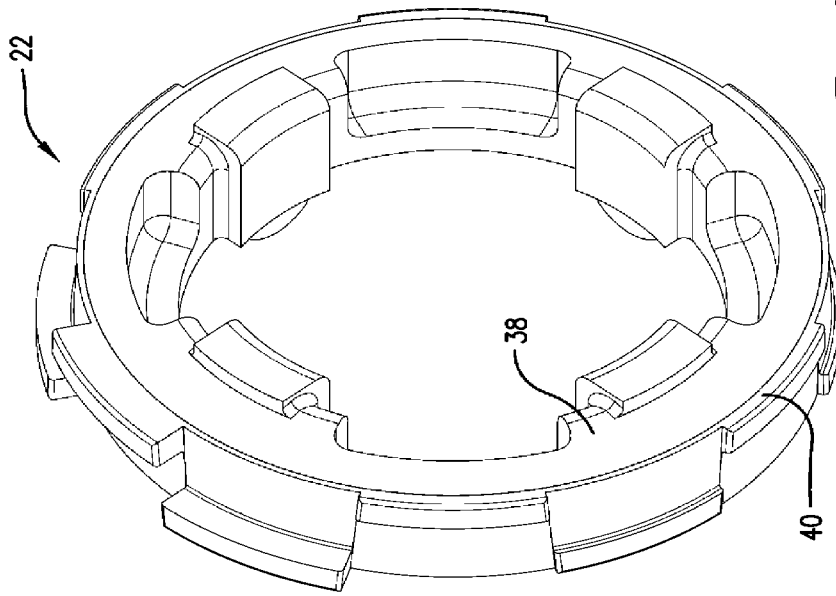
FIG. 7 is a rear perspective view of the mounting ring of FIG. 6.
Figure 6:
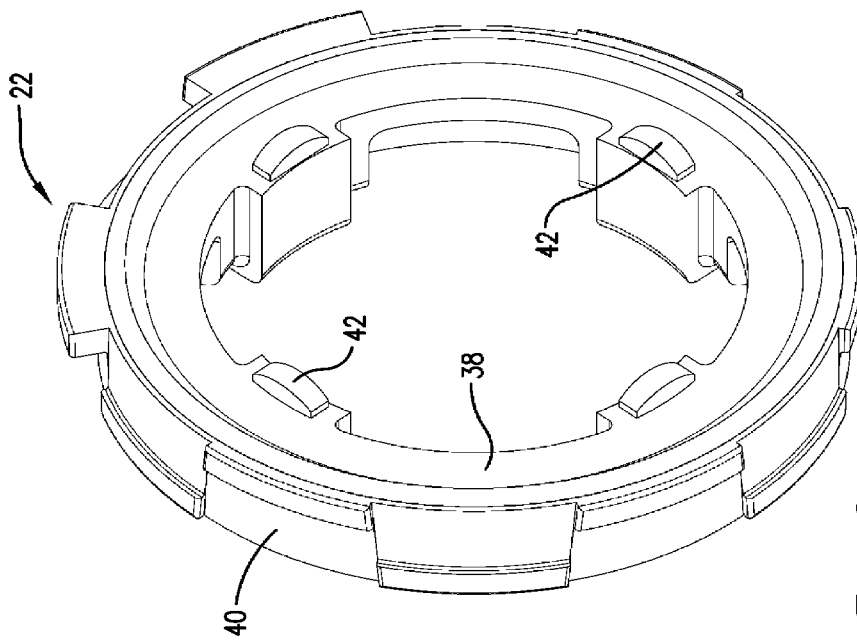
FIG. 6 is a front perspective view of the mounting ring of the prior art machine of FIGS. 1-5.

As best shown in FIGS. 6 and 7, the mounting cap 26 includes a resiliently deformable portion 38 that is circumscribed by a rigid portion 40. The deformable portion 38 includes a plurality of circumferentially spaced nodules 42. As shown in FIG. 4, the nodules 42 are configured to be compressed by the mounting cap 26 as necessary and function as a tolerancing mechanism to ensure a good fit of the deformable portion 38 between the lip 32 and the shoulders 36.

Figure 9:
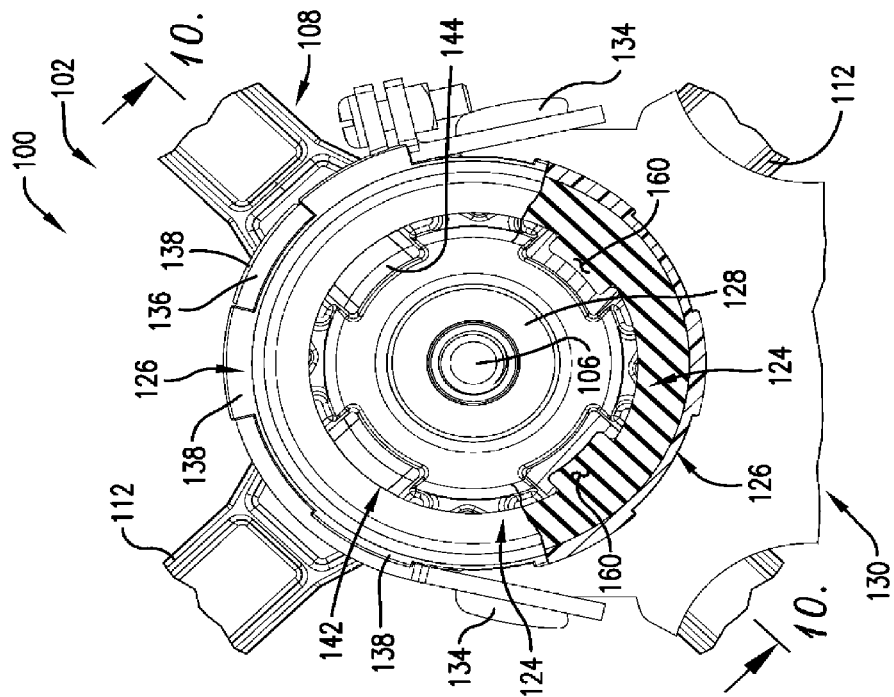
FIG. 9 is a front view of the machine of FIG. 8.
Figure 8:
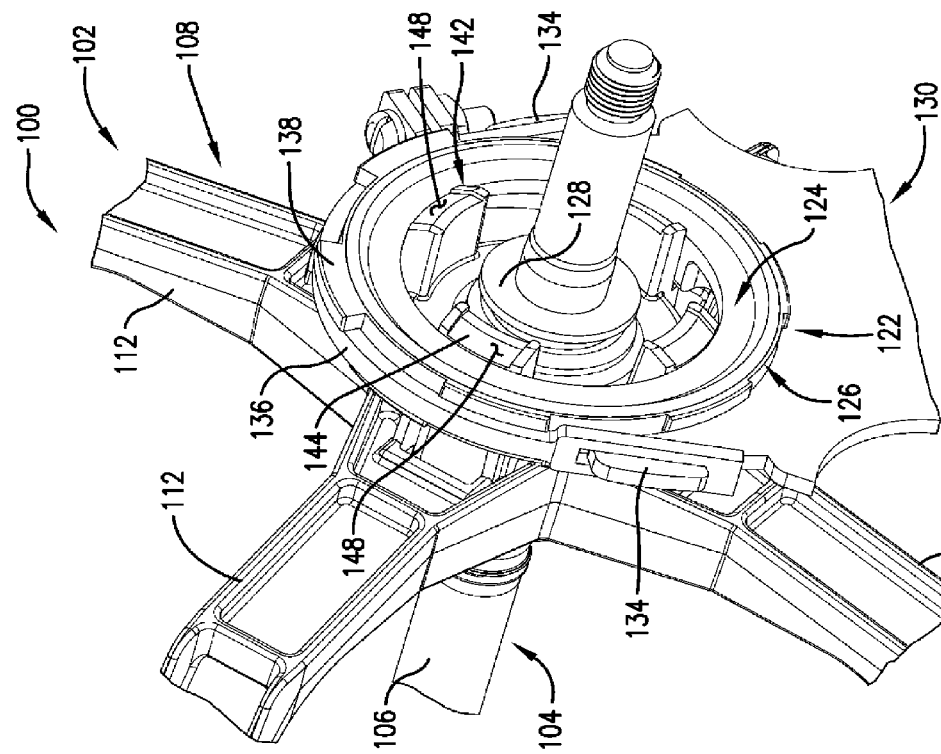
FIG. 8 is a fragmentary front perspective view of a machine constructed in accordance with a first preferred embodiment of the present invention.

Turning now to FIGS. 8 and 9, a machine 100 constructed in accordance with a first preferred embodiment of the present invention is shown. The machine 100 includes a motor 102. The motor 102 includes a rotor 104 having a rotor shaft 106 that is rotatable about an axis. The rotor shaft 106 is particularly suited to support a belt sheave (not shown), although such an arrangement is not required. The motor 102 also includes a stator (not shown) preferably positioned radially outside the rotor 104. It is within the scope of some aspects of the present invention, however, for the motor to be of an outer rotor type, with the rotor positioned radially outside of the stator, or to be a dual rotor motor having a first rotor positioned radially inside of the stator and a second rotor positioned radially outside of the stator. Any of a variety of other motor configurations are permissible, as well.

Like the prior art machine 10 of FIGS. 1-7, the machine 100 of the first preferred embodiment may suitably be any one of a variety of types, including but not limited to clothes dryers. Furthermore, as for the prior art machine 10, the machine 100 of the first preferred embodiment preferably includes substantially similar halves or portions and will be both discussed and illustrated with reference to only one of such halves. It should be understood, however, that it is permissible for one or more additional components similar to or identical to those described below to be present in the machine 100 of the first preferred embodiment.

Figure 10:
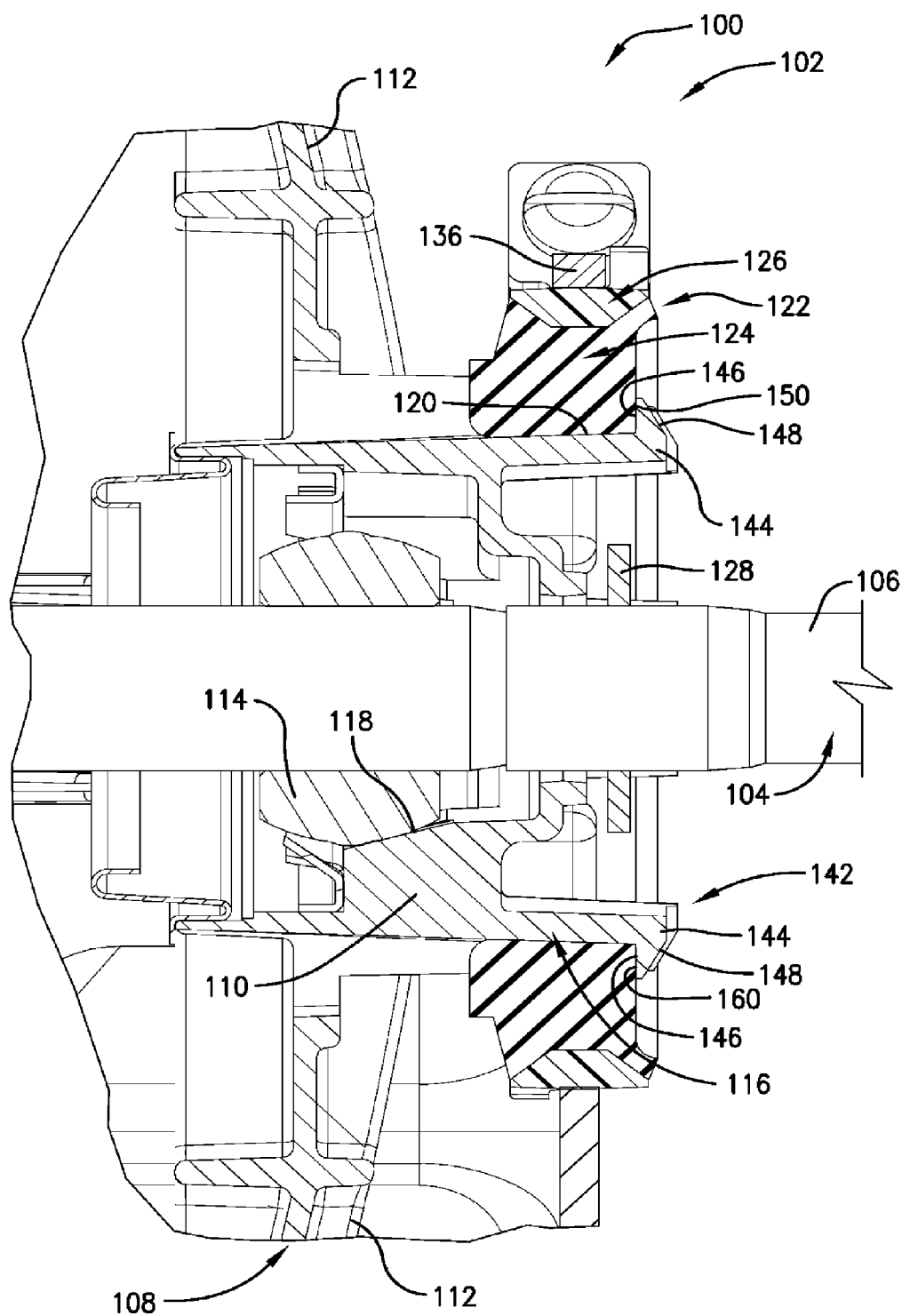
FIG. 10 is a side sectional view of the machine of FIGS. 8 and 9.
Figure 11:
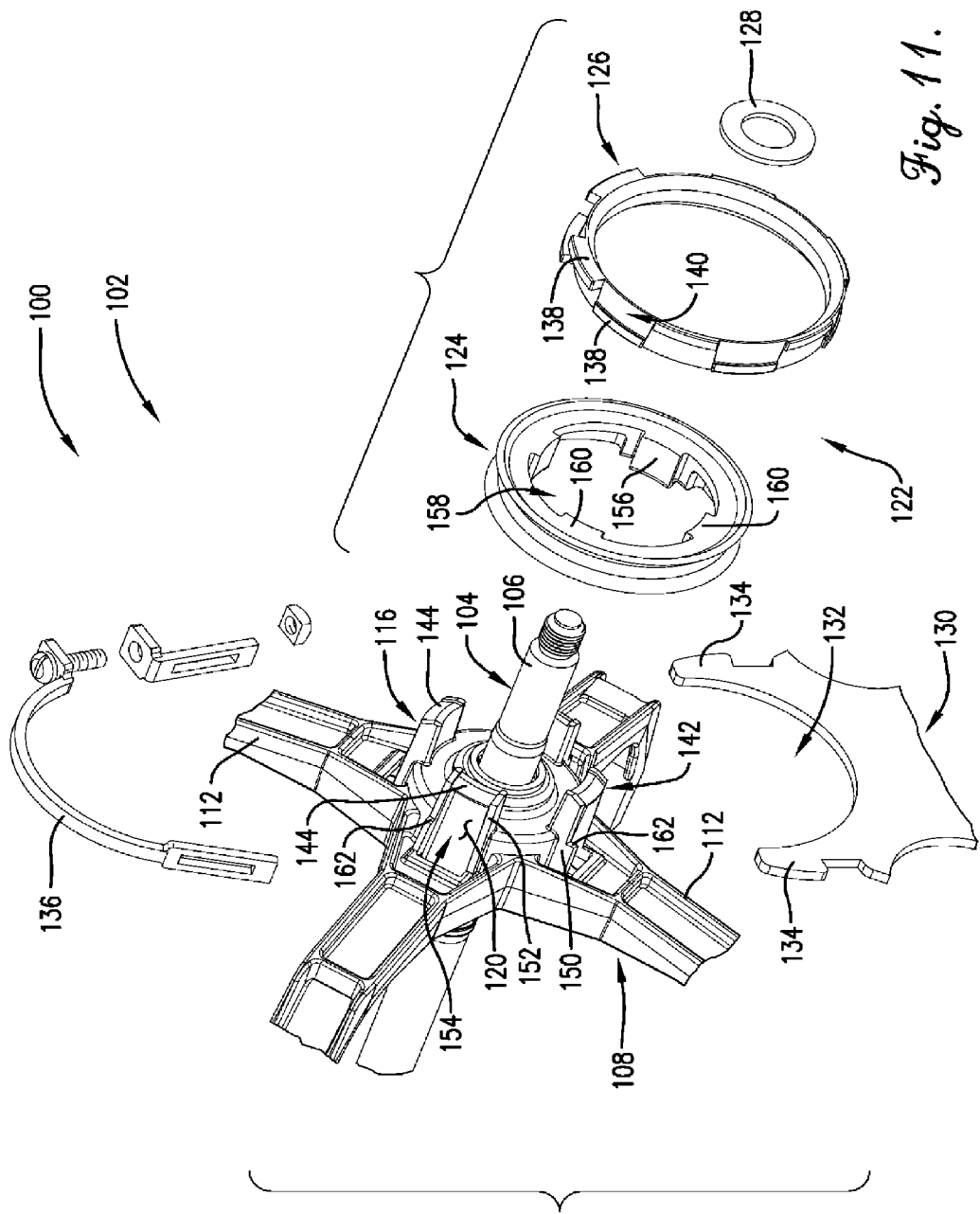
FIG. 11 is an exploded perspective view of the machine of FIGS. 8-10.

As best shown in FIG. 11, the motor 102 preferably includes a motor frame 108 including a bearing hub 110 and a plurality of arcuately spaced apart, generally radially extending arms 112 that extend from the bearing hub 110 and support the stator. The bearing hub 110 preferably supports a bearing 114 (FIG. 10) that rotatably supports the rotor shaft 106. Any one or more of a variety of bearing types, including ball bearings, are suitable for use with the present invention.

Preferably, the bearing hub 110 includes wall structure 116 that presents a bearing-engaging surface 118 spaced radially inwardly from a ring-engaging surface 120. The ring-engaging surface 120 will be discussed in greater detail below.

The motor 102 preferably includes a mounting ring 122. The mounting ring 122 is preferably circular and annular in form, although it is within the scope of some aspects of the present invention for the ring to take any of a variety of forms. For instance, the mounting ring could be a disc lacking an opening therethrough, or the mounting ring could be annular but have varying inner and outer perimeter shapes. The outer perimeter might be rectangular, for instance, while the inner perimeter might be circular.

Figure 13:
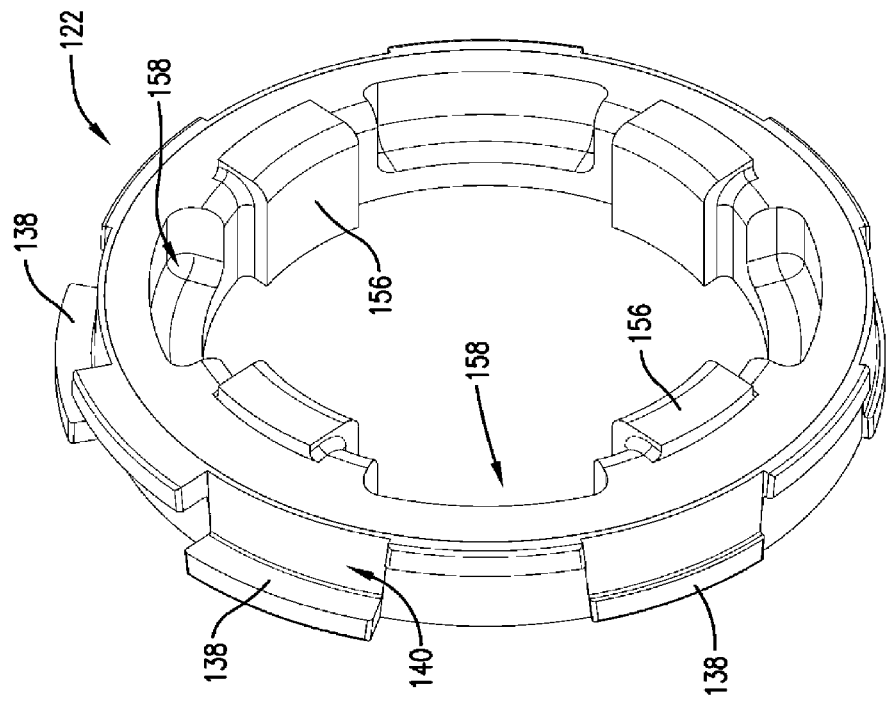
FIG. 13 is a rear perspective view of the mounting ring of FIG. 12.
Figure 12:
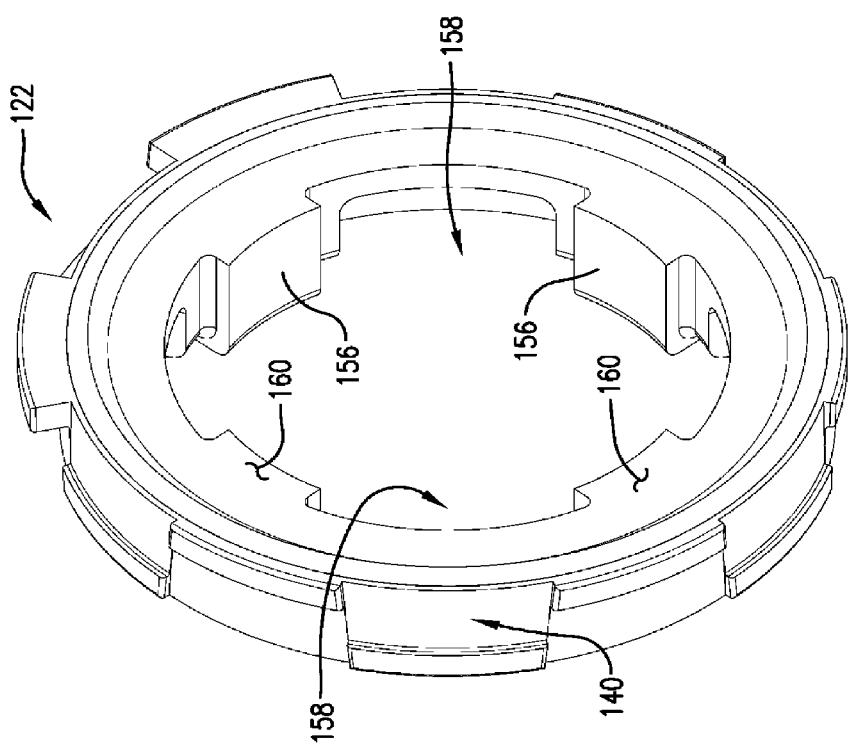
FIG. 12 is a front perspective view of the mounting ring of the machine of FIGS. 8-11.

As shown in FIGS. 12, 13, and others, the mounting ring 122 preferably includes a resiliently deformable portion 124 and a rigid portion 126 that at least substantially circumscribes the deformable portion 124. In a preferred embodiment, the deformable portion 124 comprises rubber, and the rigid portion 126 comprises a hard plastic that is preferably overmolded over the rubber deformable portion 124. However, any one or more of a variety of materials may be used without departing from the scope of the present invention. It is also permissible within the scope of some aspects of the present invention for the mounting ring to include a single rigid or deformable portion or to include more portions than the two preferred portions described above. Even further, it is within the scope of some aspects of the present invention for the deformable portion to circumscribe the rigid portion.

As shown in FIG. 10 and others, the mounting ring 122 preferably circumscribes the corresponding ring-engaging surface 120 of the wall structure 116 such that the deformable portion 124 contacts the ring-engaging surface 120 and is preferably resiliently compressed between the rigid portion 126 and the ring-engaging surface 120. This arrangement will be discussed in greater detail below.

In an alternative embodiment in which the deformable portion 124 circumscribes the rigid portion 126, it is permissible for the ring-engaging surface 120 to instead circumscribe the mounting ring 122. That is, an arrangement that is essentially an inversion of the preferred configuration is allowable.

The rotor shaft 106 preferably passes through the center of each mounting ring 122 and is rotatable relative thereto while supported on the bearing 114. It is permissible, however, for an alternative shaft arrangement to be used. For instance, the shaft might be oriented in such a manner that the mounting ring center does not lie on the axis of the shaft (e.g., the shaft might be oriented perpendicularly to the mounting ring central axis), or the shaft might include an offset section that passes outside the mounting ring.

With regard to the bearing, it is within the scope of the present invention for the center of the mounting ring to be positioned in axial alignment with the center of the bearing or to be offset. It is also permissible for the mounting ring to be positioned radially outside, radially inside, or in part radially inside and in part radially outside the bearing. In some configurations, the mounting ring might be positioned orthogonally to the bearing or at some other angle to the bearing. Furthermore, the mounting ring and bearing should not be limited to longitudinal alignment. That is, the mounting ring may be shifted in an axial direction relative to the bearing.

Preferably, a shield 128 is attached to the rotor shaft 106 and provides a physical barrier against encroachment of dust or other debris into the motor 102. However, any suitable dust or debris barrier may be applied without departing from the scope of the present invention, or such a barrier may be excluded entirely.

The machine 100 preferably includes a motor support 130 with a ring-receiving opening 132 (FIG. 11). The mounting ring 122 is secured in the ring-receiving opening 132 and supports the motor 102 in the machine 100. In a preferred embodiment, the motor support 130 includes strap-receiving projections 134. A strap 136 is attached to the support 130 at the strap-receiving projections 134 and extends around a portion of the mounting ring 122 to further secure the mounting ring 122 and motor 102 in the machine 100. More particularly, as best shown in FIGS. 6 and 7, the rigid portion 126 of the mounting ring 122 preferably includes a plurality of circumferentially spaced apart, axially staggered strap guides 138 defining a pathway 140 therebetween. The strap 136 extends from a first of the strap-receiving projections 134 and along the pathway 140 to a second of the strap-receiving projections 134.

Figure 14:
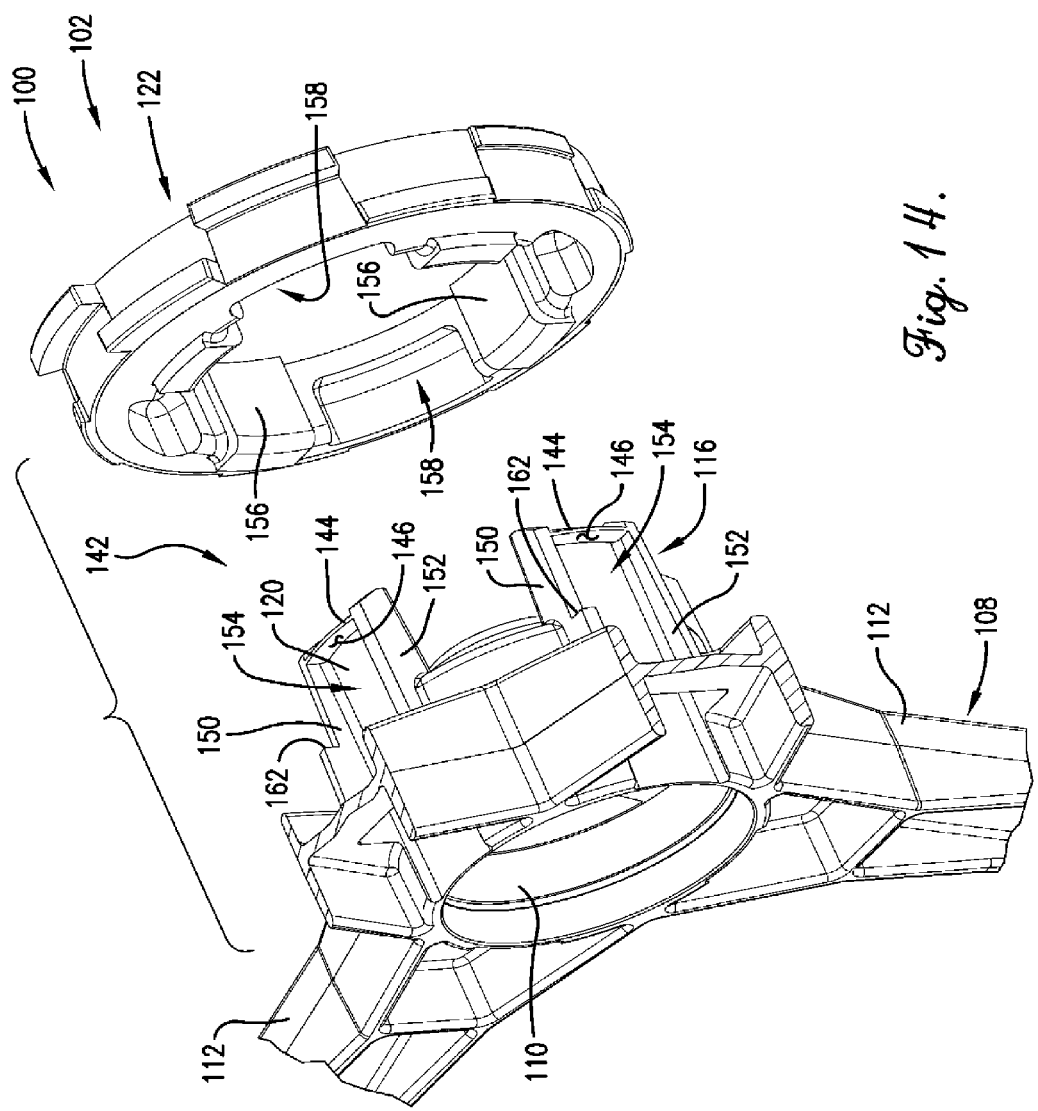
FIG. 14 is an exploded perspective view of the frame and mounting ring of the machine of FIGS. 8-11.
Figure 16:
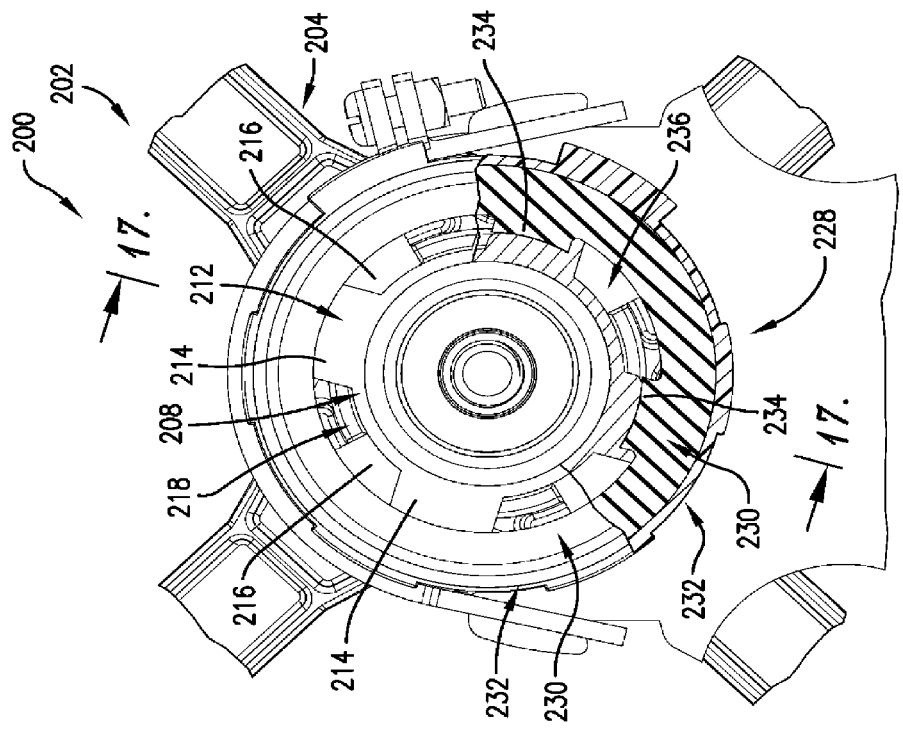
FIG. 16 is a front view of the machine of FIG. 15.
Figure 15:
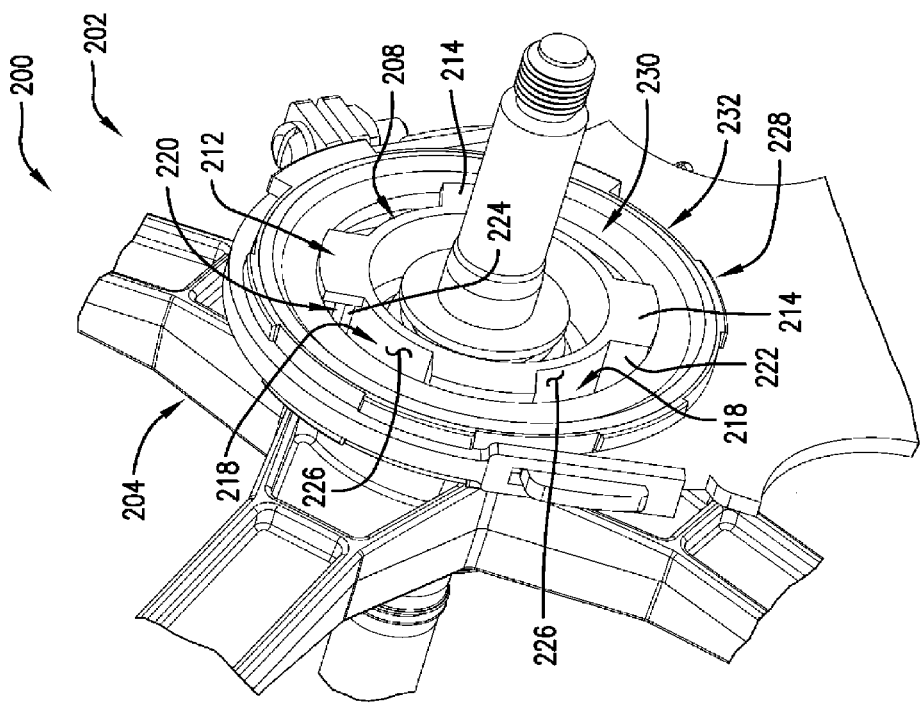
FIG. 15 is a fragmentary front perspective view of a machine constructed in accordance with a first preferred embodiment of the present invention.
Figure 17:
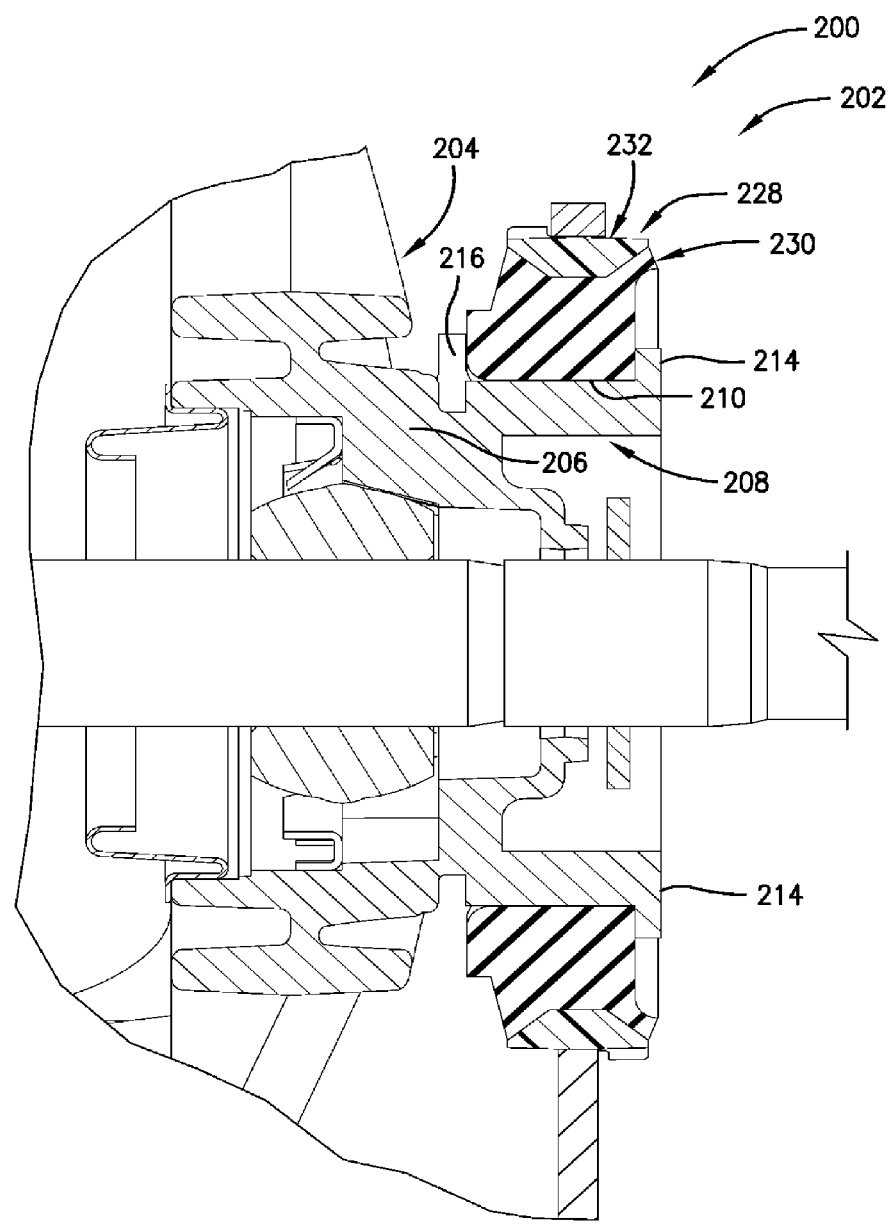
FIG. 17 is a side sectional view of the machine of FIGS. 15 and 16.

Turning to FIGS. 10, 11, and 14, the wall structure 116 includes a catch 142 comprising a plurality of circumferentially spaced apart, radially extending catch projections 144. It is permissible, however, for a single catch projection to be provided and to extend arcuately about only a portion of the wall structure or to completely circumscribe the wall structure. Preferably, each of the catch projections 144 defines a flat surface 146 spaced axially from a sloped surface 148.

The wall structure 116 also preferably includes a plurality of first radially extending faces 150 and second radially extending faces 152 arcuately spaced from the corresponding first faces 150. The corresponding first and second faces 150,152 preferably define a groove 154 therebetween. Preferably, the catch projections 144 extend between corresponding faces 150,152 so as to span the corresponding groove 154. It is permissible, however, for the catch projections 144 to span only partway across the groove 154 or to extend beyond one or both of the faces 150,152.

As shown in FIG. 14 and others, the deformable portion 124 of the mounting ring 122 preferably includes a plurality of ribs 156 corresponding to the grooves 154. The ribs 156 are preferably separated by arcuately extending spaces. The deformable portion 124 also preferably includes locking surfaces 160 (best shown in FIGS. 9, 11, and 12) corresponding to the catch projections 144. Although multiple discrete locking surfaces are preferred, a single locking surface may be provided without departing from the scope of the present invention and would most suitably correspond to an alternative embodiment utilizing a single catch projection.

For assembly of the mounting ring 122 onto the frame 108, the mounting ring 122 is initially positioned as shown in FIGS. 11 and 14, with the ribs 156 of the mounting ring 122 arcuately aligned with corresponding grooves 154. The mounting ring 122 is then moved in a first axial direction toward the frame 108. The ribs 156 of the deformable portion 124 of the mounting ring 122 then engage the sloped surfaces 148 of the catch projections 144 and are resiliently compressed by the catch projections 144 upon continued application of a force in the first axial direction. The deformation is eventually such that the deformable portion 124 and, in turn, the mounting ring 122 as a whole passes by the sloped surfaces 148 and catch projections 144. The ribs 156 are then received in the grooves 154, as shown in FIGS. 8-10.

In a preferred embodiment, each of the first faces 150 includes a radially extending shoulder 162 (FIGS. 11 and 14). The shoulders 162 block further axial movement of the mounting ring 122 in the first direction. Axial movement of the mounting ring 122 relative to the frame 108 in a second axial direction opposite the first axial direction (i.e., movement toward separation of the mounting ring 122 from the frame 108) is blocked by engagement of the locking surfaces 160 by the catch projections 144. Twisting of the mounting ring 122 relative to the frame 108 is blocked by engagement of the first and second faces 150,152 with the corresponding ribs 156.

In a preferred embodiment, the deformable portion 124 of the mounting ring 122 is radially compressed between the rigid portion 126 and the ring-engaging surface 120 such that twisting is also inhibited by friction.

It is noted that the rib-and-groove configuration described above is particularly useful for preventing or restricting relative rotation between the mounting ring and the frame. However, alternative configurations may be used to similar effect without departing from the scope of the present invention. For instance, complementary holes and posts could be provided on respective ones of the mounting ring and the frame.

In the preferred manner described above, the mounting ring 122 is secured on the frame 108 through means of wall structure 116 that is integrally formed with the frame 108. It is permissible within the scope of some aspects of the present invention, however, for various modifications to the preferred embodiment described above to be implemented. For instance, components of the wall structure or even the wall structure in its entirety might be non-integral with the frame. The shoulders could be formed on the second faces or entirely independently from the faces, or alternate structure to prevent axial motion in the first axial direction might be provided. As briefly noted above, the mounting components in general could be largely inverted to accommodate a mounting ring having a radially outer deformable portion and a radially inner rigid portion. Furthermore, it is permissible for the locking surfaces to be defined by both the deformable portion and the rigid portion or to be defined by the rigid portion alone.

The structure described above enables numerous advantages. For instance, provision of wall structure 116 that engages the mounting ring 122 enables the mounting ring 122 to be secured on the motor frame 108 without use of an additional component such as a mounting cap, thus reducing both the total cost of the motor 102 and the time required for mounting of the motor 102 in the machine 100.

Turning now to FIGS. 15-22, a second preferred embodiment of the present invention is illustrated. It is initially noted that, with certain exceptions to be discussed in detail below, many of the elements of the machine 200 of the second embodiment are the same as or very similar to those described in detail above in relation to the machine 100 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply to the second embodiment, as well.

The machine 200 of the second preferred embodiment includes a motor 202 including a frame 204 that presents a bearing hub 206. The frame 204 (and, more preferably, the bearing hub 206 of the frame 204) preferably includes wall structure 208 that defines a ring-engaging surface 210. The wall structure 208 also includes a catch 212 preferably comprising a plurality of circumferentially spaced apart, radially extending proximal catch projections 214 and a plurality of circumferentially spaced apart, radially extending distal catch projections 216 spaced axially from the proximal catch projections 214.

Figure 18:
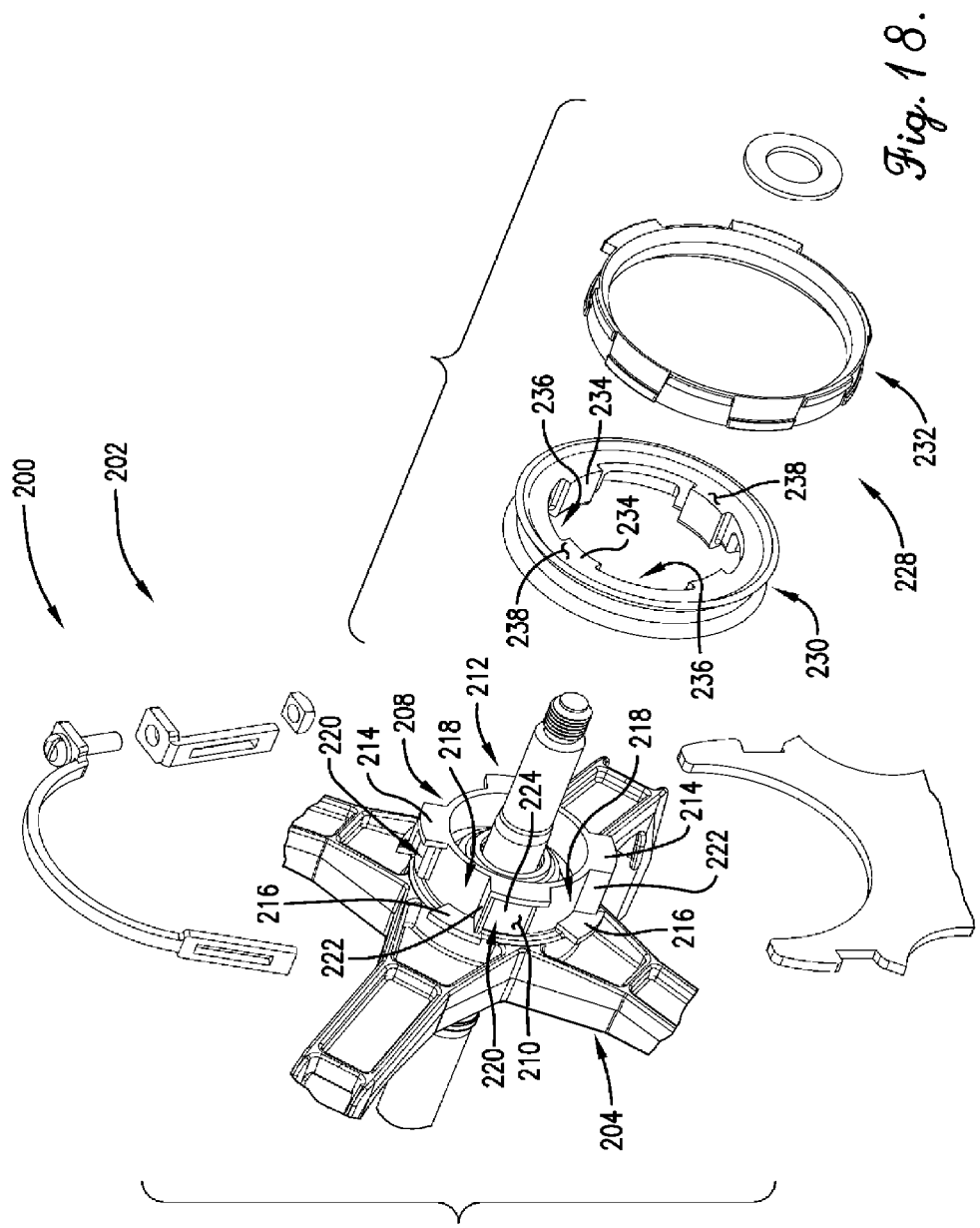
FIG. 18 is an exploded perspective view of the machine of FIGS. 15-17.
Figure 22:
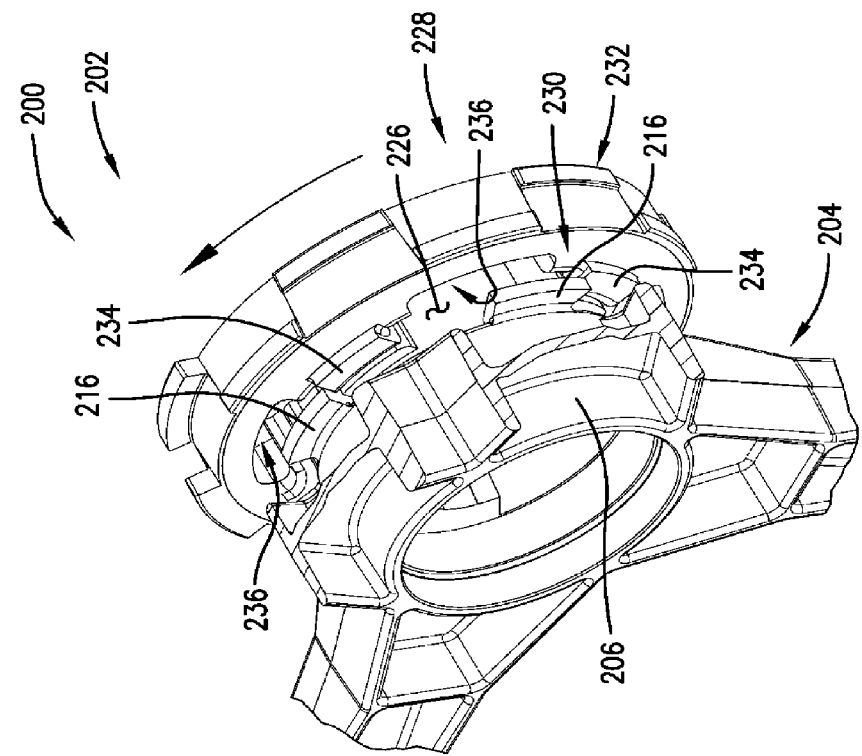
FIG. 22 is a rear perspective view of the frame and mounting ring of FIGS. 19-21, after twisting of the ring about the frame for assembly.

As best shown in FIGS. 18 and 19, the wall structure 208 defines a plurality of rib-receiving slots 218, each of which is arcuately adjacent a corresponding groove 220. More particularly, a plurality of radially extending faces 22 extend from the ring-engaging surface 210 and each define one arcuate side of a corresponding groove 220. The other arcuate side of each groove 220 is open so as to be in communication with a corresponding one of the rib-receiving slots 218. Preferably, the grooves 220 are shallow in comparison to the rib-receiving slots 218. As shown in FIGS. 18-20, for instance, the radially innermost boundary of each groove 220 is defined by a platform 224 that projects radially outwardly relative to a surface 226 that defines the radially innermost boundary of each rib-receiving slot 218.

Preferably, one of the distal catch projections 214 extends radially outwardly and in a first arcuate direction from each of the faces 222 so as to extend at least partially across the corresponding groove 220. Furthermore, one of the proximal catch projections 216 preferably extends radially outwardly from each of the faces 22 in a second arcuate direction opposite the first arcuate direction, so as to extend at least partially across the adjacent rib-receiving slot 218.

As shown in FIG. 18 and others, the motor 202 preferably includes a mounting ring 228 including a deformable portion 230 and a rigid portion 232 that preferably circumscribes the deformable portion 230. The deformable portion 230 preferably includes a plurality of ribs 232 corresponding to the grooves 220. The ribs 232 are preferably separated by arcuately extending spaces 236. The deformable portion 230 also preferably includes locking surfaces 238 (best shown in FIGS. 16, 18, and 21) corresponding to the distal catch projections 214.

Figure 21:
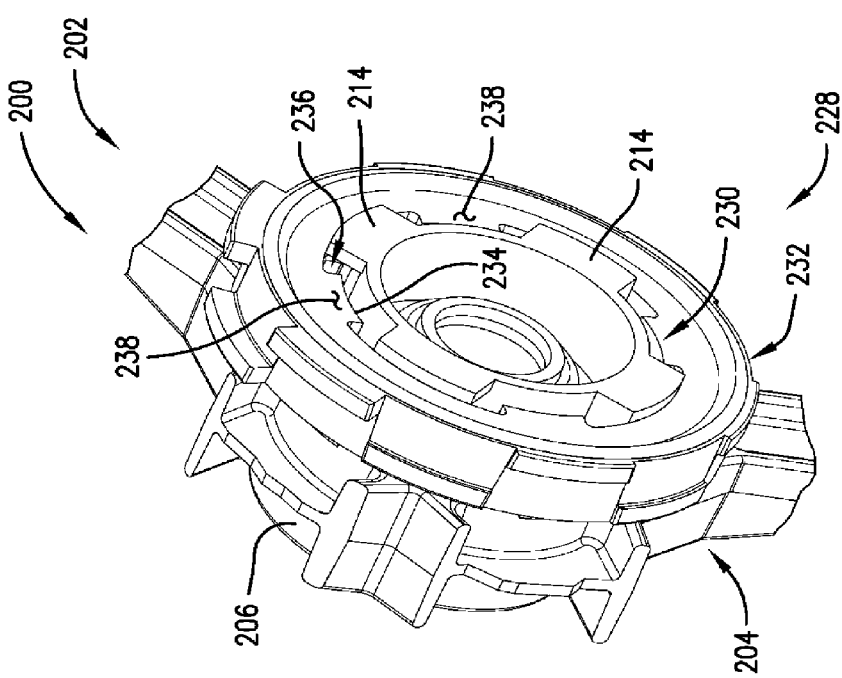
FIG. 21 is a front perspective view of the frame and mounting ring as shown in FIG. 20, after axial movement of the ring onto the frame and prior to twisting of the ring about the frame for assembly.

For assembly of the mounting ring 228 onto the frame 204, the mounting ring 228 is initially positioned as shown in FIGS. 18 and 19, with the ribs 232 of the mounting ring 228 arcuately aligned with corresponding rib-receiving slots 218. The mounting ring 228 is then moved in a first axial direction toward the frame 204 such that the ribs 232 of the mounting ring 228 are inserted into corresponding rib-receiving slots 218. The spaces 236 between the ribs 234 are preferably expansive enough to allow to the mounting ring 228 to pass unobstructed over the corresponding face 222 and platform 224 during the axial movement. As shown in FIG. 20, the deformable portion 230 then comes into contact with the proximal catch projections 214, which block further axial movement of the mounting ring 228 in the first direction. As shown in FIG. 21, the locking surfaces 238 and the distal catch projections 214 are alternately arcuately arranged after the completion of the axial motion in the first direction.

The mounting ring 228 is then twisted relative to the frame 204 in a circumferential or arcuate direction (as indicated by an arrow in FIG. 22) such that each rib 234 is received in the corresponding groove 220 and is preferably radially compressed between the rigid portion 232 of the mounting ring 228 and the corresponding platform 224 of the wall structure 208. Such compression serves to restrict untwisting of the mounting ring 228 relative to the frame 204.

It is permissible, however, for other or additional means of preventing untwisting to be provided. For instance, a plurality of arcuately spaced apart, axially extending stops might be provided for engagement with the edges of the ribs adjacent the respective open arcuate side of each groove. These stops could include a sloped surface to allow traverse via twisting in one direction and a flat, radially extending surface to prevent traverse via twisting in the other direction. The stops could be separate from or integral with the frame. The stops could be immovable or be configured to be put into position (e.g., by pivoting, snapping into place, or arcuate or radial sliding or translation) only after the mounting ring has been twisted into place. Stopping means could be provided on or be inherent to other parts of the machine, motor, or frame as well. For instance, openings provided in the arcuately spaced apart arms could be utilized. Ultimately, it is within the scope of the present invention for any of a variety of physical stop mechanisms, including mechanisms not described above, to be used to prevent untwisting of the mounting ring from the frame.

It should be noted that provision or use of physical stops such as those described above allows for elimination of compression as a means of preventing untwisting, although it is permissible for compression to be used in addition to stops or other physical obstructions.

Axial movement of the mounting ring 228 relative to the frame 204 in a second axial direction opposite the first axial direction (i.e., movement toward separation of the mounting ring 228 from the frame 204) is blocked by engagement of the locking surfaces 238 by the distal catch projections 214. Further twisting of the mounting ring 228 relative to the frame 204 in the indicated direction is blocked by engagement of the faces 222 with the corresponding ribs 234.

As will be readily apparent to one skilled in the art, the direction of twist for securing the mounting ring 228 onto the frame 204 will be dependent on the direction of the torques that will be applied by the motor 202 during operation of the machine 200. Furthermore, with reference to a motor having a similar or identical mounting ring at each of its axial end, it is understood that the twist directions may preferably be opposite one another.

It is noted that the rib-and-groove configuration described above is particularly useful for preventing or restricting relative rotation between the mounting ring and the frame. However, alternative configurations may be used to similar effect without departing from the scope of the present invention. For instance, complementary holes and posts could be provided on respective ones of the mounting ring and the frame.

In the preferred manner described above, the mounting ring 228 is secured on the frame 204 through means of wall structure 208 that is integrally formed with the frame 204. It is permissible within the scope of some aspects of the present invention, however, for various modification to the preferred embodiment described above to be implemented. For instance, components of the wall structure or even the wall structure in its entirety might be non-integral with the frame. As briefly noted above, the mounting components in general could be largely inverted to accommodate a mounting ring having a radially outer deformable portion and a radially inner rigid portion. Furthermore, it is permissible for the locking surfaces to be defined by both the deformable portion and the rigid portion or to be defined by the rigid portion alone.

The structure described above enables numerous advantages. For instance, provision of wall structure 208 that engages the mounting ring 228 enables the mounting ring 228 to be secured on the motor frame 204 without use of an additional component such as a mounting cap, thus reducing both the total cost of the motor 202 and the time required for mounting of the motor 202 in the machine 200.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A motor for a machine, wherein the motor includes a motor support with a ring-receiving opening, said motor comprising:
    a rotor;
    a stator;
    a mounting ring configured to be secured in the ring-receiving opening of the motor support,
    said mounting ring including a resiliently deformable portion configured to dampen relative motion between the motor and the machine,
    said mounting ring including a locking surface; and
    a motor frame operably supporting the rotor and stator,
    said motor frame being interconnected with the mounting ring and thereby supported on the motor support,
    said motor frame including an integral catch engaging the locking surface to at least substantially block separation of the mounting ring from the motor frame.

2. The motor as claimed in claim 1,
    said mounting ring moving along a first direction during interconnection with the motor frame, with engagement of the catch and locking surface restricting relative movement of the mounting ring in an opposite second direction.

3. The motor as claimed in claim 2,
    said rotor including a rotor shaft rotatable about a rotor axis,
    said first and second directions being opposite axial directions.

4. The motor as claimed in claim 3,
    said motor further including a bearing supported by the motor frame,
    said bearing rotatably supporting the rotor shaft.

5. The motor as claimed in claim 4,
    said motor frame including a bearing hub that supports the bearing and thereby the rotor shaft,
    said bearing hub including wall structure that presents a bearing-engaging surface and a ring-engaging surface,
    said catch projecting relative to the ring-engaging surface.

6. The motor as claimed in claim 5,
    said motor frame including a plurality of arms extending at least substantially radially from the bearing hub,
    said arms supporting the stator.

7. The motor as claimed in claim 5,
    said bearing-engaging and ring-engaging surfaces extending along the rotor axis,
    said rotor shaft extending through the motor frame and mounting ring,
    said bearing-engaging surface being spaced inwardly from the ring-engaging surface, such that the mounting ring circumscribes at least a portion of the bearing hub,
    said catch projecting radially outward relative to the ring-engaging surface.

8. The motor as claimed in claim 7,
    said catch including a plurality of projections spaced circumferentially about the ring-engaging surface.

9. The motor as claimed in claim 7,
    said deformable portion of the mounting ring being substantially annular,
    said mounting ring including a relatively rigid portion that at least substantially circumscribes the deformable portion,
    said deformable portion being resiliently compressed between the ring-engaging surface and the rigid portion.

10. The motor as claimed in claim 9,
    said deformable portion comprising rubber,
    said rigid portion comprising a hard plastic.

11. The motor as claimed in claim 9,
    said locking surface being defined by the deformable portion.

12. The motor as claimed in claim 7,
    said ring-engaging surface and mounting ring including a complemental rib-and-groove connection.

13. The motor as claimed in claim 12,
    said catch being arcuately aligned with the rib-and-groove connection, with the ring-engaging surface including the groove and the mounting ring including the rib.

14. The motor as claimed in claim 13,
    said ring-engaging surface including arcuately spaced, radially extending faces between which the groove is defined,
    said deformable portion of the mounting ring defining the rib,
    said rib being resiliently compressed by the catch as the mounting ring is moved along the first direction during interconnection with the motor frame.

15. The motor as claimed in claim 13,
    said ring-engaging surface including a radially extending face defining one arcuate side of the groove, with the other arcuate side of the groove being open,
    said ring-engaging surface including an axially extending rib-receiving slot communicating with the open side of the groove, such that the rib is shifted axially along the slot as the mounting ring is moved along the first direction and the rib is then rotated into the groove once axially aligned therewith to interconnect the mounting ring and motor frame.

16. The motor as claimed in claim 3,
    said motor frame and mounting ring including a complemental rib-and-groove connection.

17. The motor as claimed in claim 16,
    said catch being arcuately aligned with the rib-and-groove connection, with the motor frame including the groove and the mounting ring including the rib.

18. The motor as claimed in claim 17,
    said motor frame including arcuately spaced, radially extending faces between which the groove is defined,
    said deformable portion of the mounting ring defining the rib,
    said rib being resiliently compressed by the catch as the mounting ring is moved along the first direction during mounting interconnection with the motor frame.

19. The motor as claimed in claim 17,
said motor frame including a radially extending face defining one arcuate side of the groove, with the other arcuate side of the groove being open,
said motor frame including an axially extending rib-receiving slot communicating with the open side of the groove, such that the rib is shifted axially along the slot as the mounting ring is moved along the first direction and the rib is then rotated into the groove once axially aligned therewith to interconnect the mounting ring and motor frame.

\* \* \* \* \*